United States Patent [19]

Chang et al.

[11] Patent Number: 5,612,392
[45] Date of Patent: Mar. 18, 1997

[54] HEAT CURED FOUNDRY BINDER SYSTEMS AND THEIR USES

[75] Inventors: Ken K. Chang, Dublin; Thomas E. Dando, Sunbury; A. Leonard Haugse, Dublin, all of Ohio

[73] Assignee: Ashland Inc., Columbus, Ohio

[21] Appl. No.: 442,485

[22] Filed: May 16, 1995

[51] Int. Cl.⁶ .................................................. B22C 01/22
[52] U.S. Cl. ........................... 523/144; 524/557; 524/596
[58] Field of Search ............................ 523/144; 524/596, 524/557

[56] References Cited

U.S. PATENT DOCUMENTS

| | | | |
|---|---|---|---|
| 4,162,238 | 7/1979 | Bergna | 524/442 |
| 4,317,763 | 3/1982 | Menting | 523/144 |
| 4,318,840 | 3/1982 | Doyle et al. | 524/594 |
| 4,451,577 | 5/1984 | Coss | 523/144 |
| 4,761,441 | 8/1988 | Woodson | 523/144 |
| 4,929,649 | 5/1990 | Torbus et al. | 523/145 |
| 5,457,142 | 10/1995 | Dando et al. | 523/145 |

*Primary Examiner*—Robert E. Sellers
*Attorney, Agent, or Firm*—David L. Hedden

[57] ABSTRACT

This invention relates to a heat cured foundry binder system comprising as separate components (A) a furan resin, and (B) an effective amount of a curing catalyst composition comprising water, a copper aryl sulfonate, a aryl sulfonic acid, preferably polyvinyl alcohol, and a copper halide.

4 Claims, No Drawings

HEAT CURED FOUNDRY BINDER SYSTEMS AND THEIR USES

FIELD OF THE INVENTION

This invention relates to a heat cured foundry binder system comprising as separate components (A) a furan resin, and (B) an effective amount of a curing catalyst composition comprising water, a copper aryl sulfonate, a aryl sulfonic acid, preferably polyvinyl alcohol, and a copper halide.

BACKGROUND OF THE INVENTION

Heat cured binders based upon furan resins and furfuryl alcohol are well known. See for example U.S. Pat. Nos. 4,317,763, 4,451,577, and 4,383,098 which describe heat cured foundry binders, typically cured in the presence of a latent acid curing catalyst. These binders are preferred for some applications because of their price, the availability of equipment, and the dimensional accuracy of the foundry shapes made with them.

Typically heat cured binders, particularly hot-box binders, which are cured at temperatures of 100° C. to 300° C. in the presence of a latent acid curing catalyst, contain urea and other nitrogen containing compounds which scavenge free formaldehyde and provide extra strength to foundry shapes made with such binders. A problem with these heat curable foundry binders is that their high nitrogen content causes casting defects during metal casting processes such as pinholing and porosity. Another problem is that these binders contain free formaldehyde which is to be avoided.

It is also known that the bench life of foundry mixes made with these binders is often inadequate due to the presence of the latent acid curing catalyst in the foundry mix. The bench life of the foundry mix is the time period between forming the mixture of the aggregate and binder and the time when the mixture is no longer useful for making acceptable molds and cores. A measure of mold and core acceptability is tensile strength. If a foundry mix consisting of aggregate and binder composition is used after the bench life has expired, the resulting molds and cores will have insufficient tensile strength.

Since the foundry mix made with a heat curable binder contains a latent acid curing catalyst in addition to the aggregate and resin, the catalyst and resin may react prior to shaping the mix into foundry molds and cores. If this reaction occurs, it will reduce the flowability of the foundry mix and the resulting molds and cores will have reduced strength. Additionally, it will be necessary to clean the hoppers, in which the foundry mix is stored, more frequently. This is time consuming and expensive. Additionally, the latent acid curing catalyst is dissolved in a volatile organic compound which creates stress to the environment.

SUMMARY OF THE INVENTION

This invention relates a heat cured foundry binder system comprising as separate components:

A. from 50 to 90 parts of a furan resin; and

B. an effective amount of a curing catalyst composition comprising in admixture:

(1) from 0 to 30 of parts of polyvinyl alcohol having an average molecular weight of 5,000 to 100,000;

(2) from 20 to 80 parts of water;

(3) from 1 to 40 parts of a copper aryl sulfonate;

(4) from 5 to 70 parts of an aryl sulfonic acid; and (5) from 1 to 20 parts of a copper halide halide, wherein said parts by weight of the catalyst composition are based upon the total weight of the catalyst composition, and said parts of furan resin are based upon the total weight of the binder system.

Preferably the furan resin comprises from about 50 to about 90 parts by weight of a nitrogen free modified furan resin; and (1) from about 1 to about 10 parts by weight of furfuryl alcohol; (2) from about 3 to about 20 parts by weight of polyvinyl acetate; and (3) from about 3 to about 20 parts by weight of a tar selected from the group consisting of resorcinol pitch, bisphenol A tar, and mixtures thereof, wherein said parts by weight of the binder components are based upon 100 parts the weight of the binder.

The heat cured foundry binder systems are used to prepare foundry shapes. The foundry shapes are cured in the presence of the curing catalyst composition when they are heated at temperatures of about 100° C. to 300° C. Heat is applied with warm-box or hot-box equipment, baking in an oven, or with a microwave.

These binder systems are free of nitrogen and essentially free of free formaldehyde. By essentially free of free formaldehyde, it is meant that the free formaldehyde content of the binder is from 0.0 to 0.05 weight percent, based upon the total weight of the foundry binder.

Although a bench life extender can be used in the binder, it is not necessary because the foundry mix has a bench life of up to five hours without the incorporation of a bench life extender.

The catalyst composition is free of volatile organic compounds and, as a result, creates less stress to the environment. They are also stable at lower temperatures. Thus they can be used at freezing temperature or below.

ENABLING DISCLOSURE AND BEST MODE

The heat cured binders are furan binders, and are preferably nitrogen free modified furan resin and diluted with furfuryl alcohol which are cured with a curing catalyst at temperatures of from about 100° C. to 300° C. The furfuryl alcohol acts reduces the viscosity of the modified furan resin. For purposes of this disclosure, a furan binder is a binder prepared by the homopolymerization of furfuryl alcohol with itself or the hopmopolymerization of bis-hydroxymethylfuran with itself. Mixtures of furan resins with monomeric furfuryl alcohol, urea-formaldehyde resins, and/or a phenolic resins may also be used.

A "modified furan resin" is a furan resin which is made from furfuryl alcohol, phenol, and formaldehyde at elevated temperatures under essentially alkaline conditions at a pH of from 8.0 to 9.0, preferably 8.4 to 8.7. The weight percent of furfuryl alcohol used in making the nitrogen free modified furan resins ranges from 50 to 65 percent; the weight percent of the phenol used in making the nitrogen free modified furan resins ranges from 10 to 25 percent; and the weight percent of the formaldehyde used in making the nitrogen free modified furan resins ranges from 15 to 25 percent, where all weight percents are based upon the total weight of the components used to make the modified furan resin.

The reaction temperature used in making the nitrogen free modified furan resins ranges from 95° C. to 105° C. The reaction is continued until the percentage of free formaldehyde is less than 5 weight percent, typically from 3 to 5 weight percent, and the refractive index is from 1,500 to about 1,600. The viscosity of the resin is preferably from about 200 cps to 450 cps.

The heat cured binders are made by combining the nitrogen free modified furan resin with furfuryl alcohol, polyvinyl acetate, and preferably a tar selected from the group consisting of resorcinol pitch, bisphenol A tar, and mixtures thereof to make a heat cured binder system.

Typically the polyvinyl acetate used has a molecular weight average of from about 1,000 to about 100,000, preferably from about 5,000 to about 25,000. A typical viscosity of the polyvinyl acetate, in any appropriate solvent (such as benzene) when required, is about 1 centipoise to about 25 centipoise, preferably about 1 centipoise to about 5 centipoise.

Bisphenol A tar is defined as the highly viscous product which remains on the bottom of the reaction vessel after bisphenol A is produced and distilled from the reaction vessel. The bisphenol A tar is a solid at room temperature and has a melting point of about 70° C. to 80° C. Bisphenol A tar is mostly dimers, trimers, and polymeric bis phenol A. It may also contain substituted materials.

Resorcinol pitch is defined as the highly viscous product which remains on the bottom of the reaction vessel after resorcinol is produced and distilled from the reaction vessel. Resorcinol pitch is a solid at room temperature and has a melting point of about 70° C. to 80° C. Resorcinol pitch is mostly dimers, trimers, and polymeric resorcinol. It may also contain substituted materials.

Preferably a mixture of bisphenol A tar and resorcinol pitch are used to modify the binder in an amount such that the ratio of bisphenol A tar to resorcinol pitch is from 3:1 to 1:3, most preferably about 1:1.

The curing catalyst composition comprises in admixture from 0 to 30 parts, preferably from 1 to 13 parts, most preferably from 3 to 13 parts of polyvinyl alcohol having an average molecular weight of 5,000 to 100,000; from 20 to 80 parts, preferably 35 to 65 parts, of water; from 1 to 40 parts, preferably 3 to 15 parts, of a copper aryl sulfonate; from 5 to 70 parts, preferably 12 to 25, of an aryl sulfonic acid; and from 1 to 20 parts, preferably 2 to 15 parts, of a metal halide selected from the group consisting of a ferric, aluminum, or copper halide, wherein said parts by weight of the catalyst composition are based upon the total weight of the catalyst composition.

Preferably the polyvinyl alcohol has an average molecular weight of 13,000 to 23,000. Preferably the copper aryl sulfonate is copper (II) toluene sulfonate, the aryl sulfonic acid is phenolsulfonic acid, and the copper halide is copper chloride.

An effective amount of catalyst composition is used. An effective amount is the amount required to result in foundry shapes which can be handled without breaking. Generally, this amount is from 1 to 45 weight percent based upon the weight of total binder, typically from 10 to 40, preferably 15 to 35 weight percent.

It will be apparent to those skilled in the art that other additives such as release agents, solvents, etc. can be used and may be added to the binder composition, aggregate, or foundry mix. For example, where the foundry shape must show a higher degree of resistance to water, it is preferable to use a silane. In such cases the water may come from moisture in the air or special processing conditions of the foundry shapes, such as immersion in a core wash.

Silanes which can be used can be represented by the following structural formula:

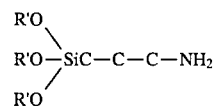

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, is employed in concentrations of 0.1% to 2%, based on the phenolic binder and hardener.

Examples of some commercially available silanes are Dow Corning Z6040; Union Carbide A-1100 (gamma aminopropyltriethoxy silane); Union Carbide A-1120 (N-beta(aminoethyl)-gamma-aminopropyltrimethoxy silane); and Union Carbide A-1160 (ureidosilane).

Although not required or preferred, bench life extenders may also be added to the binder formulation. Examples of bench life extenders include alkaline earth metal carbonates such as magnesium carbonate, calcium carbonate, and barium carbonate, and alkaline earth metal oxides such as magnesium oxide, calcium oxide, and barium oxide, preferably calcium carbonate. The particle size of the bench life extender typically is from about 0.5 micron to about 25 microns, preferably from about 1 micron to about 10 microns. It has been found that the use of the bench extender in amounts of from 0.01 to 1.0 weight percent of the thermosetting resin, preferably 0.05 to 0.5 weight percent, most preferably 0.05 to 0.1 weight percent, are effective. Although more bench life extender can be used, this is unnecessary in most cases and only increases the cost of the binder without a significant increase in benefits, and in some cases may even decrease the bench life of the foundry mix.

Since the amount of bench life extender used on the sand is a very small amount, typically from 0.001 to 0.05 weight percent based upon the weight of the aggregate, most typically 0.001 to 0.01 weight percent, for most situations it is preferable to mix the alkaline earth metal carbonate with a silicone compound to form an emulsion before adding it to the aggregate. This is an effective way of distributing the small amount of bench life extender on the aggregate. Silicone compounds also improve the release of the foundry shapes made with the foundry mix.

Silicone compounds, which can be used in the foundry mix, typically are polydimethylsiloxanes, often trimethylsilyl terminated. Generally, they are sold commercially as fluids or emulsions (which contain water and a surfactant as well as the silicone compound). Examples of commercially available products which contain silicone compounds and are effective include DC 1101, DC 108, DC 24, DC 531. All of these mentioned products are emulsions except DC 531, and all are sold by Dow Corning Corporation. Examples of other commercially available silicone compounds are LE-460, AF-70 which are sold by Union Carbide and General Electric respectively. Typically the weight ratio of the bench life extender to the silicone is from 0.50 to 5.0 weight percent based upon the total weight of the emulsion containing the bench life extender.

The aggregate used to prepare the foundry mixes is that typically used in the foundry industry for such purposes or any aggregate that will work for such purposes. Generally, the aggregate will be sand which contains at least 70 percent by weight silica. Other suitable aggregate materials include zircon, alumina-silicate sand, chromite sand, and the like.

Generally, the particle size of the aggregate is such that at least 80 percent by weight of the aggregate has an average particle size between 40 and 150 mesh (Tyler Screen Mesh).

The amount of binder system used is generally in a weight ratio of aggregate to binder of 100:1 to 10:1 where the binder system includes both the binder and catalyst composition.

Although it is possible to mix the components of the binder with the aggregate in various sequences, it is preferred to add curing catalyst composition to the aggregate and mix it with the aggregate before adding the binder.

Curing is accomplished by heating the shaped foundry mix in an a convection oven, a microwave oven, or by means of another heat source. Generally, however, curing is accomplished by injecting the foundry mix into a core box which has been heated to a temperature sufficient to cure the foundry mix and produce a workable foundry shape. Generally, the temperature needed to cure the foundry mix is from 135° C. to 300° C., preferably from 160° C. to 260° C. A workable foundry shape is one which can be handled without breaking. Generally, the dwell time of shaped foundry mix in the core box needed to produce a workable foundry shape is from 5 seconds to 120 seconds, usually from 10 seconds to 60 seconds.

Metal castings can be prepared from the workable foundry shapes by methods well known in the art. Molten ferrous or non-ferrous metals are poured into or around the workable shape. The metal is allowed to cool and solidify, and then the casting is removed from the foundry shape.

The following abbreviations are used in the Examples and Table I which follow:

| | |
|---|---|
| CC | = copper chloride |
| CT | = constant temperature |
| MFR | = a modified furan base resin for CHEM-REZ 244 binder which is the reaction product of a mixture of phenol, formaldehyde, and furfuryl alcohol under basic conditions at a reflux temperature of 100° C., such that the ratio of formaldehyde to phenol is 3:1 and the ratio of formaldehyde to furfuryl alcohol is 0.76:1.0 |
| CHEM-REZ 244 binder | = a nitrogen free modified furan binder sold by Ashland Chemical Company, which comprises 80 parts of MFR and 20 parts of furfuryl alcohol. |
| CTS | = copper (II) salt of toluene sulfonic acid. |
| MFB | consists of 80 parts of CHEM-REZ 244 binder, a nitrogen free modified furan binder sold by Ashland Chemical Company, 10 parts PVAC, 5 parts resorcinol pitch, and 5 parts water. |
| PSA | = phenolsulfonic acid (65%) in water. |
| PVAC | = polyvinyl acetate having a molecular weight average of about 20,000 sold by Monsanto Chemical under the GELVA tradename. |
| PVAL | = polyvinyl alcohol having an average molecular weight of from 3,000 to 13,000 sold by Air Products under the trademark AIRVOL 203. |
| WBC | = catalyst composition. |

EXAMPLES (All weight percents are based upon the total charge.)

Foundry mixes were prepared by mixing 4000 parts of Badger sand and 7.82 WBC for 2 minutes. Then 46 parts of binder (MFB) were added and mixed for 2 minutes.

The resulting foundry mixes are forced by air blowing the mix into a standard AFS core box (dog bone shape) which was heated to a temperature of 232° C. The tensile strengths (in psi) for various samples after being taken from the core box at specified dwell times (dwell times were 10, 20, 30, and 40 seconds), are given in Table I. The hot tensile measurements were taken within 30 seconds after removing the shapes from the core box. The cold tensiles were measured at least 1 hour after removing the shapes from the corebox.

The examples show that the foundry mixes tested had sufficient flowability and produced workable foundry shapes under the conditions tested.

Examples 1–6

Tensiles Strengths of Cores Made With Binders

TABLE I

| Example | A | B | 1 | 2 | C | 3 | 4 |
|---|---|---|---|---|---|---|---|
| CATALYST | | | AMOUNTS (pbw) | | | | |
| PSA | 0 | 0 | 35 | 35 | 0 | 37 | 37 |
| CTS | 31 | 32 | 35 | 35 | 31 | 25 | 22 |
| CC | 15 | 15 | 20 | 20 | 15 | 20 | 20 |
| PVA | 0 | 0 | 20 | 0 | 0 | 20 | 20 |
| Methanol | 54 | 0 | 0 | 0 | 0 | 0 | 0 |
| Ethanol | 0 | 53 | 0 | 0 | 54 | 0 | 0 |
| Water | 0 | 0 | 80 | 100 | 0 | 80 | 80 |
| DWELL TIME | | | HOT TENSILES OF CORE SAMPLES (PSI) | | | | |
| 10 sec. | 50 | 38 | 49 | 51 | 41 | 49 | 48 |
| 20 sec. | 65 | 60 | 76 | 71 | 46 | 66 | 65 |
| 30 sec. | 77 | 66 | 86 | 88 | 55 | 91 | 74 |
| 40 sec. | 92 | 78 | 102 | 94 | 71 | 108 | 101 |
| DWELL TIME | | | COLD TENSILES OF CORE SAMPLES (PSI) | | | | |
| 10 sec. | 173 | 236 | 325 | 296 | 220 | 348 | 320 |
| 20 sec. | 239 | 221 | 354 | 326 | 257 | 440 | 425 |
| 30 sec. | 247 | 249 | 361 | 312 | 225 | 382 | 386 |
| 40 sec. | 262 | 245 | 306 | 301 | 253 | 333 | 392 |

Table I shows that both hot and cold tensile strengths of foundry cores prepared with the subject binders are improved overall when compared to systems which use a latent acid curing catalyst dissolved in an organic solvent, i.e. Control A, B, and C. Additionally, the water based catalyst compositions of this invention do not contain any volatile organic solvents.

In order to test for low temperature stability, the catalyst compositions of Examples 1–4 were put into a refrigerator and stored at 5° C. to determine cold temperature stability. Examples 1–3, which contained more copper toluene sulfonate (CTS), showed precipitates four days after they were stored in the refrigerator. Example 4, which contained less CTS, was stored in the refrigerator for 3 months and did not show any precipitates.

Comparison Example

Catalyst composition 5-1, described in U.S. Pat. No. 4,451,577, was formulated as in the patent except the PVAL used was purchased from Air Products rather than Monsanto. It was compared to catalyst the composition of Example 4 described in Table I herein with respect to cold weather temperature stability.

| Component | Example 5-1 from U.S. Pat. No. 4,451,577 |
| --- | --- |
| PSA | 0 |
| CTS | 38 |
| PVAL | 8 |
| WATER | 54 |
| CC | 0 |

The catalyst of the Comparison Example was put into a refrigerator at a temperature of 5° C., and also stored at room temperature for stability study. Example 5-1 showed precipitates (80%) after one day of aging at room temperature and completely solidified under refrigerated conditions of 5° C. The catalyst composition of Example 4 did not show any precipitates after three months. This comparative example indicates that the catalyst composition of Example 4, which contains less CTS, is more stable when exposed to cold temperatures than the catalyst composition in U.S. Pat. No. 4,451,577. This offers obvious advantages when there is a need to work under cold conditions.

We claim:

1. A heat cured foundry binder system comprising as separate components:

A. from 50 to 90 parts of a furan resin;

B. an effective amount of a curing catalyst composition comprising in admixture:

(1) from 0 to 30 of parts of polyvinyl alcohol having an average molecular weight of 5,000 to 100,000;

(2) from 20 to 80 parts of water;

(3) from 1 to 40 parts of a copper aryl sulfonate;

(4) from 5 to 70 parts of an aryl sulfonic acid; and (5) from 1 to 20 parts of a copper halide, wherein said parts by weight of the catalyst composition are based upon the total weight of the catalyst composition, and said parts of the furan resin are based upon the total weight of the binder system.

2. The foundry binder system of claim 1 wherein the furan resin comprises from about 50 to about 90 parts by weight of a nitrogen free modified furan resin; and (a) from about 1 to about 10 parts by weight of furfuryl alcohol;

(b) from about 3 to about 20 parts by weight of polyvinyl acetate; and (c) from about 3 to about 20 parts by weight of a tar selected from the group consisting of resorcinol pitch, bisphenol A tar, and mixtures thereof, and the copper aryl sulfonate of the curing catalyst is copper toluene sulfonate, the aryl sulfonic acid of the curing catalys is phenolsulfonic acid, and the copper halide of the curing catalyst is copper chloride.

3. The foundry binder system of claim 2 wherein curing catalyst composition comprises from 3 to 13 parts of polyvinyl alcohol having an average molecular weight of 5,000 to 15,000, 35 to 65 parts of water; from 3 to 15 parts of a copper toluene sulfonate; from 12 to 25 of phenol sulfonic acid; and from 2 to 15 parts copper chloride.

4. The foundry system of claim 3 where a mixture of bisphenol A pitch and resorcinol pitch is used in a weight ratio of 3:1 to 1:3.

* * * * *